Dec. 4, 1951   C. N. GUERASIMOFF   2,577,518
FUEL INJECTION ENGINE
Filed June 11, 1945   2 SHEETS—SHEET 1
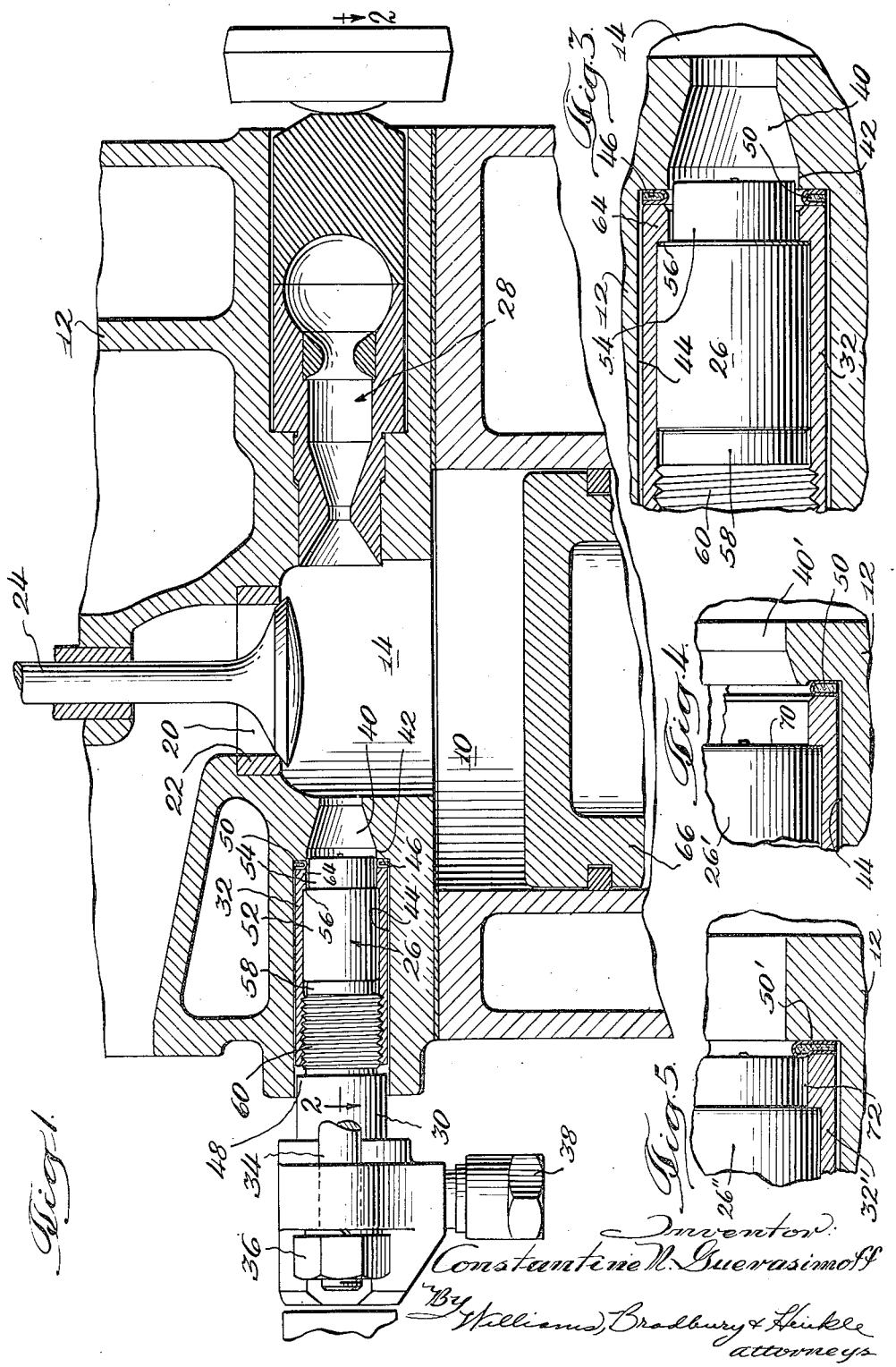
Inventor:
Constantine N. Guerasimoff
By Williams, Bradbury & Henkle
attorneys

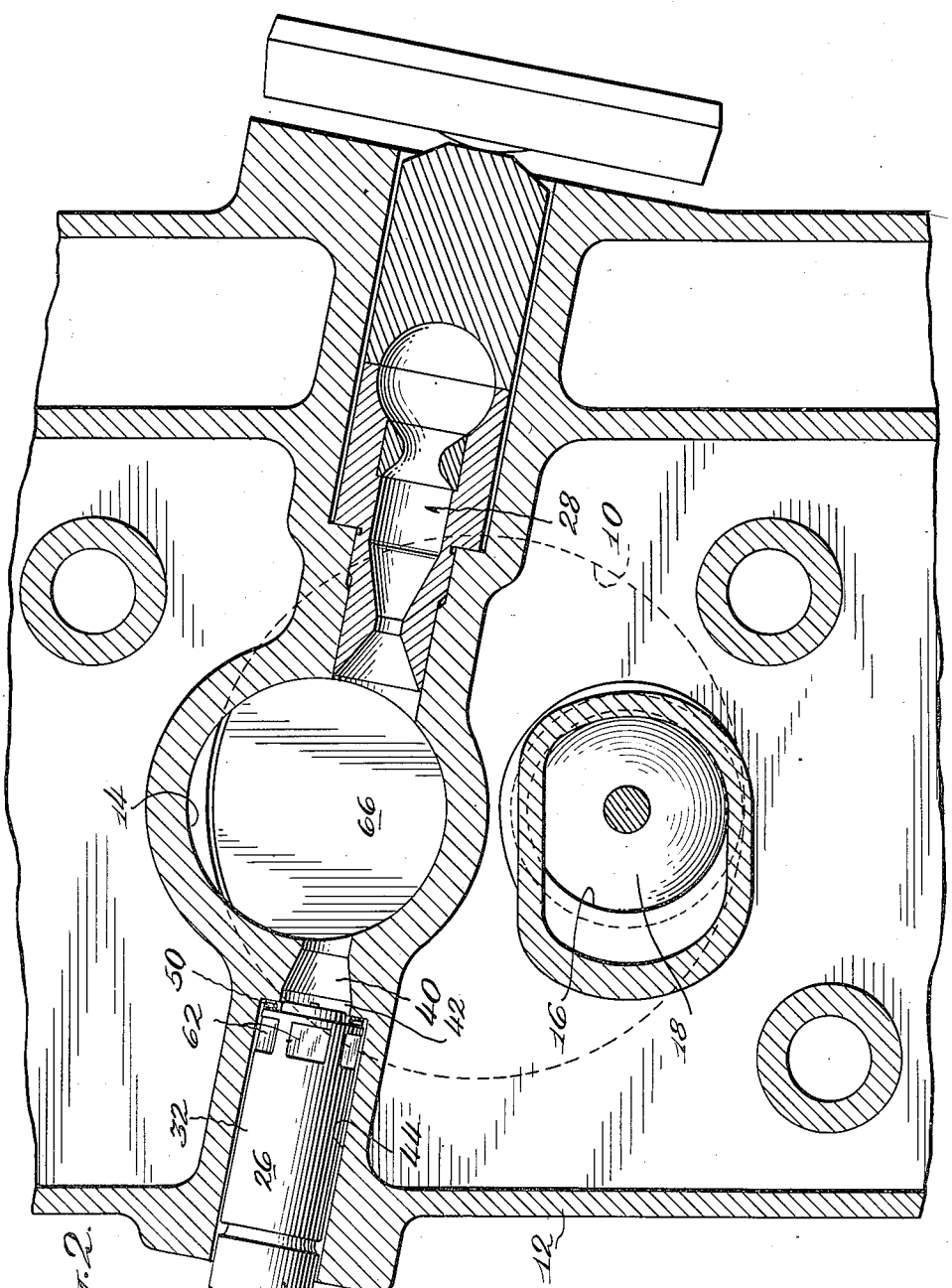

Patented Dec. 4, 1951

2,577,518

UNITED STATES PATENT OFFICE 2,577,518

FUEL INJECTION ENGINE

Constantine N. Guerasimoff, Harvey, Ill., assignor to The Buda Company, Harvey, Ill., a corporation of Illinois Application June 11, 1945, Serial No. 598,886

13 Claims. (Cl. 123—32)

My invention relates to fuel injection engines, and more particularly to diesel engines of the energy cell types.

In diesel engines utilizing energy cells, it is common practice to locate the energy cell slightly out of alignment with the fuel injecting nozzle, so that the blast of burning gases occasioned by the discharge from the energy cell is not directed exactly toward the tip of the fuel injecting nozzle. This misalignment of the energy cell has the disadvantage that the blast from the cell does not create as complete a dispersion of the injected fuel as occurs where the cell and nozzle are in exact alignment. Heretofore, the impracticability of arranging the cell and nozzle in exact alignment has been due to the fact that the blast from the cell directly against the nozzle tip has caused overheating of the nozzle and sticking of the nozzle plunger in the barrel in which it operates.

An object of my invention is to provide a new and improved fuel injection engine wherein the nozzle and energy cell are located in exact alignment, and the construction and arrangement are such that overheating of the nozzle is avoided.

Another object of my invention is to provide a new and improved construction whereby the temperature of a fuel injection nozzle operating under conditions of extreme heat, is maintained below the temperature at which the fuel gums and interferes with the operation of the nozzle plunger.

Other objects and advantages will become apparent as the description proceeds.

In the drawings,

Fig. 1 is a vertical sectional view through the cylinder head of an energy cell type of diesel engine, embodying a preferred form of my invention;

Fig. 2 is a partial horizontal sectional view taken on the line 2—2 of Fig. 1;

Fig. 3 is an enlarged view of the nozzle tip and adjacent structure;

Fig. 4 is an enlarged partial sectional view showing a modification of the nozzle structure and arrangement; and Fig. 5 is a view similar to Fig. 4, but showing a further modification.

Referring particularly to Figs. 1 and 2, it will be seen that I have illustrated my invention as applied to a diesel engine having a cylinder 10 closed at its upper end by a cylinder head 12 providing a combustion chamber 14 in open communication with the cylinder 10 and offset with respect to the axis of such cylinder. The combustion chamber 14 is circular in horizontal section, as clearly shown in Fig. 2. Air is supplied to the cylinder 10 through an intake port 16 controlled by the usual intake valve 18, and the exhaust gases are discharged through an exhaust port 20 preferably provided with the usual steel insert 22 on which the exhaust valve 24 seats.

Fuel is injected into the combustion chamber 14 by a fuel nozzle 26 which is illustrated as being in exact axial alignment with a conventional energy cell 28. The fuel nozzle 26 is attached to a nozzle holder 30 by means of a nozzle cap nut 32 attached to the cylinder head 12 by studs 34 and nuts 36. Fuel is supplied through fuel pipes 38 and the fuel is discharged from the nozzle into the combustion chamber 14 by way of a short passage 40.

In my novel arrangement, passageway 40 opens into a short cylindrical bore 42, and this bore in turn merges with a larger bore 44 at annular shoulder 46. The bore 44 is adapted to receive the portion 48 of the nozzle holder with the nozzle cap nut 32 attached and a gasket 50 interposed between the inner end of the cap nut 32 and the shoulder 46. This gasket 50 is of a heat insulated type such as a mica-terneplate gasket for minimizing the flow of heat to the nozzle. The mica-terneplate gasket shown consists of a mica core protected by a U-shaped covering of mild steel.

The nozzle 26 comprises a large diameter portion 52 extending the greater part of the length of the nozzle and a smaller diameter portion 54 of minimum length. The junction of these two portions provides a shoulder 56 which is engaged by a complementary shoulder on the cap nut 32, whereby this nut firmly clamps the nozzle 26 against the inner end 58 of the nozzle holder to which the nut is threaded, as indicated at 60. The cap nut 32 is provided with flat wrench-engaging surfaces 62 so that this nut can be rotated firmly to clamp the nozzle to the nozzle holder.

The nozzle 26, as most clearly shown in Fig. 3, includes a plunger 57 which is urged by a spring (not shown) against a valve seat 59 normally to prevent discharge of fuel from the nozzle. An annular space 61 is supplied with fuel through a passage 63 and when the fuel in the chamber 61 attains a sufficient pressure as a result of operation of the usual fuel pump, the plunger 57 is moved away from valve seat 59 and fuel is discharged from the nozzle 26. The plunger 57 and associated parts are made to extremely close tolerances and any substantial compressive force exerted on the reduced end 54 of the nozzle, where the wall structure is relatively thin, will cause binding of and interfere with the proper operation of the plunger.

The thickened forward end 64 of the cap nut 32 has an internal diameter slightly greater than the external diameter of the reduced portion 54 of the nozzle 26, whereby a small annular clearance is provided between these parts. This clearance space is necessary to prevent the end 64 of the cap nut 32 from being forced against and exerting a compressive force on the portion 54 of the nozzle when the nuts 36 are tightened to force the cap nut 32 against the gasket 50. This annular space, however, is in open communication with the combustion chamber through passage 40 and during combustion contains burning gases which tend to heat up the nozzle and particularly the tip portion thereof.

A feature of my invention resides in reducing this clearance space to a minimum by making the small diameter portion 54 of the nozzle of minimum length. This reduces the surface area of the nozzle exposed to burning gases and prevents overheating of the nozzle with resulting precipitation and deposit of gums in the fuel and interference with operation of the nozzle plunger by such deposit.

In the operation of my novel engine, the air is drawn into the cylinder 10 through the intake port 16 on the suction stroke of the piston 66. On the succeeding upward or compression stroke of the piston, this air is compressed in the combustion chamber 14 and energy cell 28. As the piston approaches the upper limit of its compressive stroke, fuel is injected into and across the combustion chamber 14 by nozzle 26, and part of this fuel enters the energy cell 28. Combustion in the energy cell produces a discharge therefrom which creates a vigorous turbulence in the combustion chamber and directs burning gases toward the fuel nozzle 26. The exact alignment of the cell and nozzle produces complete dispersion or atomization of the solid core of fuel, allowing it to mix intimately with the available particles of air.

Because the annular clearance space between the thickened end 64 of the nozzle cap nut 32 and the reduced portion 54 of the nozzle 26 is of minimum length, a minimum area of the nozzle is exposed to burning gases for any given diameter of nozzle. Furthermore, a minimum amount of heat is transmitted to the nozzle from the cylinder head since the heat insulating gasket 50 reduces the transfer of heat between the forward end of the nut 32 and the adjacent shoulder provided by the cylinder head, and the remainder of this nut 32 and the adjacent portion of the nozzle holder 48 are of smaller diameter than the bore 44 so that there is an annular clearance space between the nut and holder and the cylinder head.

Because of the minimum area of the nozzle exposed to the gases of combustion and the minimum of heat tranfer from the cylinder head to the nozzle, the fuel flowing through the nozzle cools the nozzle and maintains it well within a safe heat operating range, despite the blast of burning gases directed against the nozzle by discharge from the energy cell.

In Fig. 4, I have shown a modified form of my invention, wherein the nozzle 26' is of uniform outside diameter and wherein the cylindrical surface of the nozzle is completely shielded against the burning gases. Only the small end surface 70 of the nozzle is exposed to the burning gases.

In this form of my invention, the passage 40' which connects the nozzle with the combustion chamber 14 is shorter and the forward end of bore 44 extends closer to the combustion chamber. The operation of this modification is essentially the same as that of the form previously described.

In the modification of Fig. 5, the gasket 50' is of modified design and contacts both the small end of the nozzle 26" and the adjacent end of the nozzle cap 32". This entirely seals off the cap nut from any contact with the burning gases, and also seals off the annular space 72 between the small diameter end of the nozzle and the surrounding portion of the cap nut, so that burning gases do not penetrate this space. The forward or righthand end of the cap nut 32" extends beyond the adjacent end of the nozzle so that the gasket 50' is tightly squeezed between the forward end of the cap nut and the opposing shoulder provided by the cylinder head, whereas only light pressure is created between this gasket and the adjacent end of the nozzle, so as not to cause excessive pressure on the nozzle which would produce distortion and interfere with the operation of the nozzle plunger. The operation of this form of my invention is essentially the same as that of the previous forms, except that in the form of Fig. 5, even less heat is transmitted to the nozzle by the burning gases and from the cylinder head.

While I have illustrated and described three forms of my invention, it is to be understood that my invention is not limited to the particular details illustrated and described, but may assume numerous other forms, and includes all modifications and variations coming within the appended claims.

I claim:

1. In an internal combustion engine of the fuel injection type, the combination of means providing a cylinder, a cylinder head removably attached to said means, said cylinder head having a combustion chamber formed therein and opening into said cylinder, an energy cell communicating with said combustion chamber, a fuel feeding nozzle discharging into said combustion chamber and energy cell, said nozzle being located in a portion of said cylinder head operating at a higher temperature than said nozzle, said nozzle having a small diameter discharge end of minimum length and a longer portion of larger diameter, a sleeve enclosing said nozzle and having a portion surrounding said smaller end in spaced relation thereto, said spaced relation providing an annular space communicating with said combustion chamber, said sleeve engaging said nozzle at the junction of the two diameter portions thereof to limit said space in one direction, means insulating said sleeve from said cylinder head, and means for supplying fuel to said nozzle.

2. An internal combustion engine of the class described, comprising means providing a cylinder and combustion chamber communicating therewith, said means providing a passage communicating with said combustion chamber and a bore merged with said passage, a fuel injecting nozzle located in said bore and discharging fuel through said passage into said combustion chamber, an energy cell communicating with said combustion chamber and adapted to receive part of the fuel discharged by said nozzle, said nozzle having a tip exposed to said passage and being located in a wall portion operating at a higher temperature than the nozzle, a nozzle holder attached to said means, a nozzle cap nut for clamping said nozzle to said holder, said nut having a portion surrounding the tip of said nozzle and cooperating therewith to form an annular space communicating with said passage, said nozzle and nut having interengaging shoulders limiting said annular space to a length less than one-third that of the nozzle, a heat insulating gasket interposed between said means and the end of said nut nearest said passage, and means for supplying fuel to said nozzle.

3. An internal combustion engine of the class described, comprising means providing a chamber in which combustion occurs, a nozzle for supplying fuel to said chamber, said means providing communicating bores leading to said chamber and providing a shoulder at the point of communication, a fuel injecting means located in one of said bores and heat insulated from said shoulder, said engine being so constructed and arranged that the portion of the combustion chamber wall in which said nozzle is located operates at a higher temperature than said nozzle, said fuel injecting means having a nozzle tip surrounded by an annular space of minimum length communicating with said chamber, said fuel injecting means having only a single area mechanically engaging the walls of said bores, means insulating said area from said first named means, and means for supplying fuel to said nozzle.

4. In an internal combustion engine of the class described, the combination of means providing a chamber in which combustion takes place, said means providing a bore communicating with said chamber, a two diameter fuel injecting nozzle located in said bore, said fuel injection nozzle being located in a wall of said chamber operating at a higher temperature than said nozzle, the portion of said nozzle of smaller diameter being in fluid communication with said chamber and being of minimum length, the larger portion of said nozzle being substantially longer than said smaller portion, two diameter means interposed between said nozzle and the wall of said bore, said last named means sealing off the large part of said nozzle from fluid contact with said chamber, said two diameter means cooperating with the smaller part of said nozzle to provide a space surrounding said part in open communication with said chamber, an insulating gasket separating said last named means and space from gases of combustion and from said first named means, and means for supplying fuel to said nozzle.

5. In a diesel engine of the class described, the combination of a block providing a cylinder, a cylinder head providing a combustion chamber communicating with said cylinder, a nozzle located in said head and discharging into said chamber, an energy cell communicating with said chamber and substantially opposite said nozzle and at such distance that part of the fuel discharged by said nozzle enters said cell, said nozzle being located in a wall portion of said combustion chamber operating at a higher temperature than said nozzle, said nozzle having a small diameter part exposed to burning gases and a larger diameter part longer than said small diameter part, means for sealing said large diameter part against contact with said burning gases, said means preventing heat transfer from said head to said nozzle, and means for supplying fuel to said nozzle.

6. In a diesel engine of the class described, the combination of a cylinder, a piston reciprocal therein, a fuel nozzle for injecting fuel, said fuel nozzle being located in a portion of cylinder wall operating at a higher temperature than said nozzle, means for admitting air to said cylinder, means for supplying fuel to said nozzle, and means for reducing the operating temperature of said nozzle, said means including heat insulating means and enclosing means whereby the area of said nozzle exposed to heat of combustion is minimized.

7. A fuel injection nozzle assembly for an internal combustion engine having a nozzle-receiving wall operating at a higher temperature than the nozzle, said nozzle assembly comprising a two diameter cylindrical nozzle having a small diameter end adapted to be exposed to gases of combustion, a large diameter end substantially longer than said small diameter end, a nozzle holder to which said nozzle is attached and having means for securing said nozzle to a part of an internal combustion engine, a nozzle cap nut for securing said nozzle to said nozzle holder, said nut having a portion closely fitting the large diameter part of said nozzle and in intimate heat transmitting contact therewith, said nut having a second portion surrounding the small diameter part of said nozzle in spaced relation thereto whereby said small diameter part of the nozzle is protected against compressive forces when said assembly is secured to a part of an engine, the space between the small diameter part of said nozzle and the surrounding portion of said nut being of minimum size, whereby contact between said nozzle and gases of combustion is reduced to a minimum with corresponding reduction in heating of said nozzle by said gases, and heat insulating means between said nozzle holder and said wall.

8. In an engine of the class described, the combination of means providing a cylinder and combustion chamber, an energy cell communicating with said combustion chamber, a fuel nozzle for discharging fuel into said combustion chamber and cell, said nozzle being in exact alignment with said cell, said cell communicating with said combustion chamber through a restricted opening whereby a jet-like discharge from the cell is produced, a holder for said nozzle, a nozzle cap nut securing said nozzle to said holder, said means providing a bore with a shoulder therein for receiving a part of said nozzle holder with said nut and nozzle attached thereto, and a single heat insulating gasket forming a seal between said shoulder and said nozzle and nut, said gasket limiting the area of said nozzle exposed to gases of combustion and preventing said gasket from contacting said nut.

9. A fuel injection engine comprising means providing a combustion chamber and having a shouldered bore communicating therewith, a nozzle holder and nozzle cap nut located in said bore, said cap nut having portions of different internal diameters, a two diameter nozzle located in said cap nut, the smaller diameter of said nozzle forming the discharge end and being surrounded by and in spaced relation to the smaller diameter of said nut, said engine having a chamber wall adjacent said nozzle operating at a higher temperature than said nozzle, a heat insulating gasket interposed between said shoulder and the discharge end of said nozzle and between said shoulder and the adjacent end of said nut and preventing gases of combustion from contacting said nut and the sides of said nozzle, and means for creating greater pressure on the part of said gasket between said shoulder and nut than on the part of said gasket between said shoulder and nozzle to protect the latter against distorting forces resulting from compression thereof.

10. A nozzle assembly for a fuel injection engine having a cylinder wall with a nozzle-receiving portion operating at a higher temperature than the nozzle, said nozzle assembly comprising a nozzle holder, a fuel injecting nozzle, and a nut for clamping said nozzle to said holder, said nut and nozzle having ends remote from said holder adapted to form contact with a sealing and heat insulating gasket, said end of said nut extending beyond said end of said nozzle.

11. In a diesel engine of the class described, the combination of means providing a cylinder and combustion chamber, an energy cell communicating with said combustion chamber, a fuel nozzle in exact alignment with said cell and discharging into said combustion chamber and cell, said cell communicating with said combustion chamber through a restricted opening providing a jet-like discharge from said cell, said fuel nozzle being of uniform external diameter, a holder for said nozzle, a nut for attaching said nozzle to said holder, said nut having a portion surrounding said nozzle and a second portion of smaller internal diameter extending beyond the discharge end of said nozzle, said means providing a shouldered bore for receiving said nut and nozzle, and a heat insulating gasket interposed between said shoulder and said second portion of said nut.

12. A nozzle assembly for an internal combustion engine of the fuel injection type having a wall for receiving a fuel injection nozzle which operates at a higher temperature than the nozzle, said assembly comprising a fuel nozzle of uniform external diameter having a discharge end, a holder for said nozzle, a nut securing said nozzle to said holder, said nut having a part surrounding said nozzle and a second part of lesser diameter extending beyond the discharge end of said nozzle, and heat insulating means between said holder and wall.

13. In a diesel engine of the class described, the combination of means providing a combustion chamber, an energy cell communicating with said chamber through a restricted opening providing a jet-like discharge, a fuel injecting nozzle for supplying fuel to said chamber and cell, said nozzle being in exact axial alignment with said cell whereby discharge from said cell directs a blast of burning gases against said nozzle, a water jacket for said combustion chamber, and heat insulating means independent of said jacket for preventing overheating of said nozzle and sticking of the nozzle plunger therein.

CONSTANTINE N. GUERASIMOFF.

REFERENCES CITED

The following references are of record in the file of this patent:

UNITED STATES PATENTS

| Number | Name | Date |
| --- | --- | --- |
| 1,954,082 | Lang | Apr. 10, 1934 |
| 2,080,189 | Schwaiger | May 11, 1937 |
| 2,119,781 | Fischer | June 7, 1938 |
| 2,157,658 | Fischer | May 9, 1939 |